United States Patent Office 3,457,308
Patented July 22, 1969

3,457,308
PREPARATION OF ORGANOTHIOPHOSPHORUS HALIDES
Leo C. D. Groenweghe, Olivette, Mo., assignor to Monsanto Company, St. Louis, Mo., a corporation of Delaware
No Drawing. Filed Dec. 22, 1965, Ser. No. 515,765
Int. Cl. C07f 9/42, 9/20
U.S. Cl. 260—543                    12 Claims

ABSTRACT OF THE DISCLOSURE

Process for the preparation of organophosphonothioic dihalides [RP(S)X$_2$] and diorganophosphinothioic halides [R$_2$P(S)X] which comprises heating a compound of the formula (RS)$_{(2-n)}$PX$_{(1+n)}$ at a temperature above about 200° C. wherein R is hydrocarbyl of not more than 18 carbon atoms and X is halogen.

---

This invention relates to processes for the preparation of compounds of phosphorus and more particularly to processes for the preparation of organophosphonothioic dihalides and diorganophosphinothioic halides.

In accordance with this invention phosphorus compounds selected from the group consisting of (a) compounds of the formula

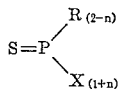

wherein R, which can be the same or different, is hydrocarbyl of not more than 18 carbon atoms bonded to the phosphorus atom through a carbon-phosphorus bond, X is halogen (Cl, Br, F and I) and $n$ is an integer from 0 to 1, and (b) mixtures thereof are prepared by the process which comprises heating a compound selected from the group consisting of (1) compounds of the formula (RS)$_{(2-n)}$P—X$_{(1+n)}$ wherein R is hydrocarbyl of not more than 18 carbon atoms and X and $n$ are as defined above, and (2) mixtures thereof at a temperature above about 200° C.

The organothiophosphorodihalidites and di(organothio)phosphorohalidites represented by the formula (RS)$_{(2-n)}$P—X$_{(1+n)}$ wherein R, X, and $n$ as defined above are well-known compounds. One method for their preparation comprises reacting an organomercaptan with a phosphorus trihalide until the evolution of hydrogen halide is substantially complete.

The thermal rearrangement of this invention can be represented by following the non-stoichiometric expressions

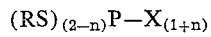

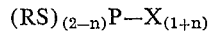

wherein R and X are as defined above. In accordance with the above represented reactions, the process of this invention results in the concomitant production of organophosphonothioic dihalides [RP(S)X$_2$] and diorganophosphinothioic halides [R$_2$P(S)X]. In reaction (a) above the organophosphonothioic dihalides generally comprise a major amount of the product phosphorus compounds whereas in reaction (b) above the organophosphonothioic dihalides generally comprise a major amount of the product phosphorus compounds. Thus, in reaction (c) above the ratio of organophosphinothioic dihalide to diorganophosphinothioic halide in the product phosphorous compounds depends upon the ratio of the RSPX$_2$ and (RS)$_2$PX reactants.

Representative R hydrocarbon radicals for the compounds of the above formulae prepared by the process of this invention include by way of example alkyl (1 to 18 carbon atoms) such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 18 carbon atoms; cycloalkyl and alkyl substituted cycloalkyl (3 to 18 carbon atoms) such as cyclopentyl, cyclohexyl, mono- and polymethylcyclohexyl, mono- and polyethylcyclohexyl, cycloheptyl and the like; cycloalkenyl and alkyl substituted cycloalkenyl (3 to 18 carbon atoms) such as cyclopentenyl, cyclohexenyl, cycloheptenyl, mono- and polyethylcyclohexenyl and the like; aryl (6 to 18 carbon atoms) such as phenyl, biphenyl, naphthyl and the like, aralkyl (7 to 18 carbon atoms) such as benzyl, phenylethyl, diphenylmethyl and the like, and alkaryl (7 to 18 carbon atoms) such as tolyl, ethylphenyl, xylyl, butylphenyl, tert-butylphenyl, trimethylphenyl, diethylphenyl, methylpropylethylphenyl and the like.

The thermal rearrangement of this invention can be carried out by heating organothiophosphorodihalidites, di(organothio)phosphorohalidites or mixtures thereof in the liquid or vapor phase at temperatures from about 200° C. to about 600° C. Temperatures below about 200° C. can be used but reaction time is increased substantially as such lower temperatures. In most cases, the reaction is preferably carried out at temperatures from about 225° C. to about 350° C. for liquid phase rearrangement and from about 300° C. to about 600° C. for vapor phase rearrangement from the standpoint of optimum conversion in reasonable reaction periods. The thermal rearrangement can be carried out at subatmospheric, atmospheric or superatmospheric pressure, the pressure not being critical. The exact reaction conditions, i.e. time, temperature and pressure will depend upon the specific organic sulfide employed.

The thermal rearrangement also can be carried out in the presence of an inert organic medium for liquid phase rearrangement or an inert carrier gas for vapor phase rearrangement. Suitable organic media include for example xylene, mesitylene, "Decalin," dichlorobenzene, benzene, toluene, "Tetralin" and chlorinated biphenyls. Suitable vapor phase inert carriers include for example nitrogen, helium, argon and methane.

The separation of the desired phosphorus compound from the product mixture is readily accomplished by conventional means well known in the art, e.g., fractional distillation under reduced pressure, selective extraction, fractional distillation using a carrier gas, film distillation, elution or any suitable combination of these methods.

The phosphorus compounds prepared by the thermal rearrangement of this invention and numerous uses therefor are well-known in the art. These compounds are useful as fire retardants and rust inhibitors, and as chemical intermediates in the preparation of petroleum additives, agricultural chemicals, organo-phosphorus polymers and other products of commercial interest. For example, valuable lubricity additives for lubricating oils can be prepared by reacting phosphorus compounds prepared by the process of this invention with phenol at temperatures from about 80° C. to about 150° C. in the presence of an acid acceptor in accordance with the following equations $$RP(S)X_2 + 2C_6H_5OH \rightarrow RP(S)(OC_6H_5)_2 + 2HX$$

$$R_2P(S)X + C_6H_5OH \rightarrow R_2P(S)OC_6H_5 + HX$$

wherein R and X are as defined above.

The following examples will illustrate the invention. Parts and percent are by weight unless otherwise indicated.

EXAMPLE 1

A reaction vessel equipped with stirrer, thermometer, Dry Ice condenser and inlet tube is charged with 549.4 parts of phosphorus trichloride. While maintaining the temperature at about 65° C. and stirring, 190.0 parts of methyl mercaptan are introduced into the vessel through the inlet tube below the surface of the liquid over a period of about 6 hours. After the addition of methyl mercaptan, the reaction mixture is stirred until the evolution of HCl is substantially complete. Nuclear magnetic resonance (NMR) spectrum analysis shows the reaction mixture contains, based on the total mols of phosphorus compounds present, 58.7 mol percent of methylthiophosphorodichloridite and 20.1 mol percent of di(methylthio)phosphorochloridite. The reaction mixture is fractionated to recover the $CH_3SPCl_2$ boiling in the range of 28–32° C., at a pressure of 9 mm. of mercury. The recovered methylphosphorodichloridite is sealed in a reaction vessel and heated at 305° C. for about 24 hours. The vessel is cooled to room temperature and the product mixture is removed. NMR spectrum analysis shows that the product mixture contains, based on the total mols of phosphorus compounds, 83 percent methylphosphorothioic dichloride and 9 percent dimethylphosphinothioic chloride. The product mixture is fractionated to recover methylphosphonothioic dichloride boiling in the range of 60–70° C. at a pressure of 50 mm. of mercury, and dimethylphosphinothioic chloride at about 58–61° C., 10 mm. of mercury.

EXAMPLES 2 TO 8

Employing substantially the same procedures as in Example 1 but without the gas delivery tube, heptyl mercaptan, phenyl mercaptan, ethyl mercaptan, n-propyl mercaptan, isopropyl mercaptan, n-amyl mercaptan, and benzyl mercaptan, respectively, are reacted with equimolar amounts of phosphorus trichloride. The dichloridites are recovered by fractional distillation and then heated at the temperature and for the time as given in Table I below. Results and further details are given in Table I.

TABLE I

| Example | Dichloridite | Temperature, °C. | Time, hr. | Product [1] RP(S)Cl_2 | R_2P(S)Cl |
|---|---|---|---|---|---|
| 2 | $CH_3(CH_2)_6SPCl_2$ | 265 | 70 | 40 | 30 |
| 3 | $C_6H_5SPCl_2$ | 265 | 70 | 80 | 10 |
| 4 | $C_2H_5SPCl_2$ | 265 | 70 | 60 | 10 |
| 5 | $n-C_3H_7SPCl_2$ | 265 | 70 | 50 | 5 |
| 6 | $i-C_3H_7SPCl_2$ | 265 | 70 | 30 | 30 |
| 7 | $n-C_5H_{11}SPCl_2$ | 265 | 70 | 25 | 20 |
| 8 | $C_6H_5CH_2SPCl_2$ | 265 | 70 | 80 | 5 |

[1] Yield in mol percent based on the total mols of phosphorus compounds present in the liquid product mixture as determined by NMR.

EXAMPLES 9 AND 10

The reaction products of equimolar amounts of methyl mercaptan with $PBr_3$ are prepared using substantially the same procedure as in Example 1. The mixtures containing $CH_3SPBr_2$ and $(CH_3S)_2PBr$ are then heated at the temperatures and for the times given in Table II below to prepare the desired organophosphonothioic dibromides and diorganophosphinothioic bromides by thermal rearrangement. Results and further details are given in Table II.

TABLE II

| Example | Thermal rearrangement Temp.,°C. | Time, hr. | Product [1] CH_3P(S)Br_2 | (CH_3)_2P(S)Br |
|---|---|---|---|---|
| 9 | 230 | 7 | 40 | 10 |
| 10 | 300 | 6 | 60 | 20 |

[1] Yield in mol percent based on the total mols of phosphorus compounds present in the liquid product mixture as determined by NMR.

EXAMPLES 11 TO 31

The reaction products of equimolar amounts of various organic mercaptans of the formula RSH with $PCl_3$ wherein R is as given below in Table III are prepared using substantially the same procedure as in Example 1, except that with liquid or solid mercaptans the gas delivery tube is not required. The mixtures containing $RSPCl_2$ and $(RS)_2PCl$ are then heated at the temperatures and for the time given in Table III to prepare the desired organophosphonothioic dichlorides and diorganophosphinothioic chlorides by thermal rearrangement. Results and further details are given in Table III.

TABLE III

| Ex. | Mixture containing [1] a RSPCl_2 and (RS)_2PCl wherein R represents— | Thermal rearrangement Temp., °C. | Time, hr. | Product [2] RP(S)Cl_2 | R_2P(S)Cl |
|---|---|---|---|---|---|
| 11 | Methyl | 305 | 24 | 74 | 13 |
| 12 | Ethyl | 260 | 8 | 44 | 8 |
| 13 | n-Propyl | 275 | 21 | 47 | 15 |
| 14 | Isopropyl | 290 | 65 | 75 | 7 |
| 15 | n-Butyl | 290 | 8 | 45 | 39 |
| 16 | Isobutyl | 290 | 8 | 42 | 6 |
| 17 | Tert-butyl | 290 | 8 | 41 | 4 |
| 18 | n-Amyl | 290 | 65 | 40 | 34 |
| 19 | n-Hexyl | 290 | 8 | 32 | 37 |
| 20 | n-Heptyl | 265 | 70 | 35 | |
| 21 | n-Octyl | 290 | 8 | 37 | 36 |
| 22 | n-Dodecyl | 290 | 8 | 25 | 34 |
| 23 | Cyclohexyl | 290 | 8 | 31 | 36 |
| 24 | Allyl | 150 | 60 | 44 | |
| 25 | Benzyl | 230 | 60 | 90 | |
| 26 | Phenyl | 290 | 70 | 53 | 18 |
| 27 | p-Chlorophenyl | 290 | 12 | 86 | |
| 28 | p-Tolyl | 290 | 8 | 52 | |
| 29 | p(Tert-butyl)phenyl | 290 | 8 | 64 | |
| 30 | p-(n-Nonyl)phenyl | 290 | 8 | 30 | |
| 31 | 2-naphthyl | 290 | 12 | 61 | |

[1] Reaction product of equimolar amounts of organic mercaptan and $PCl_3$.
[2] Yield in mol percent based on total mols of phosphorus compounds present in liquid product mixture as determined by NMR.

EXAMPLE 32

A mixture of $CH_3SPCl_2$ and $(CH_3S)PCl$ which contains a major amount of $(CH_3S)_2PCl$ is heated in a sealed vessel at 305° C. for 24 hours. Gas chromatographic analysis of the liquid product mixture shows that 15 wt. percent of methylphosphonothioic dichloride and 65 wt. percent of dimethylphosphinothioic chloride is present in the product mixture.

EXAMPLE 33

Employing substantially the same procedure as in Example 1, equimolar amounts of methyl mercaptan and phosphorus trichloride are reacted to obtain a mixture containing $CH_3SPCl_2$ and $(CH_3S)_2PCl$. The mixture containing $CH_3SPCl_2$ and $(CH_3S)_2PCl$ is pumped into a U-tube immersed in a bath containing a heat transfer agent at a temperature of about 550° C. at a rate of about 1 part per minute. A stream of dry nitrogen flowing at a rate of about 100 parts per minute is also admitted to the U-tube. The average residence time is about five seconds. The gas stream emerging from the U-tube is led into an ice-cooled receiver. A total of 17 parts of the mixture containing $CH_3SPCl_2$ and $(CH_3S)_2PCl$ is introduced into the system over a period of about 17 minutes. The thermally rearranged product material is removed from the receiver and subjected to NMR spectrum analysis. The analysis shows that, based on the total mols of phosphorus compounds, the product mixture contains 33.4 mol percent of methylphosphonothioic dichloride and 16.9 mol percent of dimethylphosphinothioic chloride.

The embodiments of the invention in which an exclusive property or privilege is claimed are defined as follows:

1. Process for the preparation of phosphorus compounds selected from the group consisting of (a) compounds of the formula

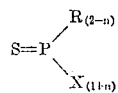

wherein each R is hydrocarbyl of not more than 18 carbon atoms selected from the group consisting of alkyl, cycloalkyl, cycloalkenyl, aryl, alkaryl and aralkyl, X is selected from the group consisting of Cl, Br, F and I, and $n$ is an integer from 0 to 1, and (b) mixtures thereof which comprise heating a compound selected from the group consisting of (1) compounds represented by the formula

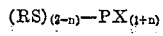

wherein R, X and $n$ are as defined above, and (2) mixtures thereof at a temperature from about 200° C. to about 600° C.

2. Process of claim 1 carried out in the liquid phase at a temperature above about 225° C.
3. Process of claim 1 wherein R is alkyl.
4. Process of claim 1 wherein R is aryl.
5. Process of claim 3 wherein R is methyl.
6. Process of claim 4 wherein R is phenyl.
7. Process of claim 1 carried out in the vapor phase at a temperature above about 300° C.
8. Process of claim 1 wherein the compound of (1) is $RSPX_2$.
9. Process of claim 1 wherein the compound of (1) is $(RS)_2PX$.
10. Process of claim 1 wherein R is methyl and X is Cl.
11. Process of claim 1 wherein R is phenyl and X is Cl.
12. Process of claim 1 wherein R is benzyl and X is Cl.

References Cited

UNITED STATES PATENTS 3,078,304   2/1963   Niebergall.
3,184,496   5/1965   Baranauckas et al. __ 260—969
3,337,658   8/1967   Senkbeil et al. _____ 260—960

OTHER REFERENCES

Kosolapoff: "Organophosphorus Compounds" (1950), pp. 187, 193.

BERNARD HELFIN, Primary Examiner
J. E. EVANS, Assistant Examiner

U.S. Cl. X.R.

46—6; 260—960, 961, 973, 976